(12) United States Patent
Kosaka et al.

(10) Patent No.: US 7,735,870 B2
(45) Date of Patent: Jun. 15, 2010

(54) FRONT STRUCTURE OF VEHICLE BODY

(75) Inventors: Naoya Kosaka, Susono (JP); Koji Tamakoshi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 323 days.

(21) Appl. No.: 11/884,779

(22) PCT Filed: Feb. 3, 2006

(86) PCT No.: PCT/JP2006/302306

§ 371 (c)(1),
(2), (4) Date: Aug. 21, 2007

(87) PCT Pub. No.: WO2006/090592

PCT Pub. Date: Aug. 31, 2006

(65) Prior Publication Data

US 2008/0150271 A1 Jun. 26, 2008

(30) Foreign Application Priority Data

Feb. 22, 2005 (JP) ............................. 2005-046066

(51) Int. Cl.
*B62D 7/22* (2006.01)
*B62D 21/11* (2006.01)
(52) U.S. Cl. .................. 280/784; 280/788; 296/187.09
(58) Field of Classification Search .................. 280/784, 280/788, 781; 296/192, 193.09, 187.09, 296/187.1, 187.12, 193.02, 193.05, 193.06, 296/198, 203.02, 29
See application file for complete search history.

(56) References Cited

U.S. PATENT DOCUMENTS 4,717,198 A 1/1988 Komatsu (Continued)

FOREIGN PATENT DOCUMENTS

EP 1 184 262 3/2002

(Continued)

OTHER PUBLICATIONS

International Search Report.

(Continued)

*Primary Examiner*—Paul N Dickson
*Assistant Examiner*—Drew Brown
(74) *Attorney, Agent, or Firm*—Finnegan, Henderson, Farabow, Garrett & Dunner, LLP

(57) ABSTRACT

A front structure 1 of a vehicle body has a shock absorber receiver 13 projecting forward from a dash panel 3, which is located at a position corresponding to a shock absorber 8 in a vehicle width direction and in a vehicle height direction. In the front structure 1 of the vehicle body, the shock absorber receiver 13 restricts backward movement of the shock absorber 8 upon a collision of a vehicle 2, so that a collision load acting on the shock absorber 8 can be efficiently dispersed to a framework of the vehicle body while being transmitted through the shock absorber receiver 13 to the dash panel 3. When the shock absorber 8 moves backward upon the collision of the vehicle 2, the shock absorber 8 comes into contact with the shock absorber receiver 13, and the distance becomes shorter between support points of the shock absorber 8 than before, so as to enhance flexural rigidity and reaction force.

10 Claims, 6 Drawing Sheets

U.S. PATENT DOCUMENTS

| | | | |
|---|---|---|---|
| 5,087,074 A | 2/1992 | Komatsu et al. | |
| 7,140,674 B2 * | 11/2006 | Miyoshi et al. | 296/203.03 |
| 2001/0033094 A1 * | 10/2001 | Sano et al. | 296/194 |
| 2005/0046237 A1 * | 3/2005 | Miyoshi et al. | 296/203.02 |
| 2008/0150326 A1 * | 6/2008 | Maruyama et al. | 296/192 |

FOREIGN PATENT DOCUMENTS

| | | |
|---|---|---|
| JP | 62-58260 | 4/1987 |
| JP | 1-83676 | 6/1989 |
| JP | 1-178181 | 12/1989 |
| JP | 2-293276 | 12/1990 |
| JP | 3-24904 | 3/1991 |
| JP | 2501686 | 4/1991 |
| JP | 2529464 | 7/1991 |
| JP | 4-133872 | 5/1992 |
| JP | 7-186656 | 7/1995 |
| JP | 2002-104242 | 4/2002 |
| JP | 2002-321648 | 11/2002 |
| JP | 2003-146242 | 5/2003 |
| JP | 2003-154969 | 5/2003 |

OTHER PUBLICATIONS

Supplementary European Search Report.
Japanese Office Action dated Jul. 22, 2008.

* cited by examiner

FRONT STRUCTURE OF VEHICLE BODY

TECHNICAL FIELD

The present invention relates to a front structure of a vehicle body.

BACKGROUND ART

A conventional front structure of a vehicle body in various vehicles such as cars adopts a structure for absorbing impact upon a collision with another vehicle. A known front structure of a vehicle body of this type is one in which an energy absorbing part for absorbing a collision load acting on an engine is constructed of a bulge of a cross member located in front of a dash panel (e.g., reference is made to Japanese Patent Application Laid-Open No. 2003-154969).

DISCLOSURE OF THE INVENTION

In recent years it is desirable to disperse the collision load. A demand is to disperse the collision load in the front part of the vehicle more efficiently than in the conventional technology described in the foregoing Japanese patent application.

The present invention has been accomplished in order to solve the above problem and an object of the invention is to provide a front structure of a vehicle body capable of efficiently dispersing the collision load acting on the front part of the vehicle.

A front structure of a vehicle body according to the present invention is a front structure of a vehicle body having a shock absorber extending between the vehicle body and a front wheel in a vehicle and supported on the vehicle body side, and a dash panel forming a front wall of a cabin of the vehicle behind the shock absorber and connected to a framework of the vehicle body, the front structure comprising a shock absorber receiver projecting from the dash panel toward the shock absorber, wherein the shock absorber receiver is located at a position corresponding to the shock absorber in a vehicle width direction and in a vehicle height direction.

Since in this front structure of the vehicle body the shock absorber receiver projecting forward from the dash panel is located at the position corresponding to the shock absorber in the vehicle width direction and in the vehicle height direction, the shock absorber receiver restricts backward movement of the shock absorber upon a collision of the vehicle and a collision load acting on the shock absorber is transmitted through the shock absorber receiver to the dash panel to be dispersed efficiently to the framework of the vehicle body. As the shock absorber moves backward upon the collision of the vehicle, the shock absorber and the shock absorber receiver come into contact with each other, to increase the number of support points of the shock absorber (points where the shock absorber is supported) and the distance between the support points becomes shorter than before, so as to enhance flexural rigidity and reaction force; therefore, this structure is resistant to a higher collision load than before. The "position corresponding to the shock absorber in the vehicle width direction and in the vehicle height direction" herein means a position where the shock absorber receiver located posteriorly overlaps a part or the whole of the shock absorber in the vehicle width direction and in the vehicle height direction when viewed from the front of the vehicle.

An example of the structure is a configuration having: a wheel house covering the shock absorber and the front wheel and connected to the framework of the vehicle body; and a wheel house brace projecting from the wheel house toward a region posterior to the shock absorber, wherein the shock absorber receiver supports the wheel house brace from a back side thereof and projects from the wheel house brace toward the shock absorber. This configuration effectively achieves the above-described action and is able to restrict backward movement of the wheel house brace by the shock absorber receiver, whereby the collision load acting on the shock absorber is transmitted through the wheel house brace to the wheel house and is thus dispersed more efficiently to the framework of the vehicle body such as a front side member or an apron upper member, for example. When the wheel house brace moves backward with backward movement of the shock absorber upon the collision of the vehicle, the bending interval of the wheel house brace becomes shorter, so as to enhance flexural rigidity and reaction force; therefore, the structure is resistant to a much higher collision load.

Another front structure of a vehicle body according to the present invention is a front structure of a vehicle body having a shock absorber extending between the vehicle body and a front wheel in a vehicle and supported on the vehicle body side, and a dash cross member extending in a vehicle width direction behind the shock absorber and in front of a cabin of the vehicle and forming a part of a framework of the vehicle body, the front structure comprising a shock absorber receiver projecting from the dash cross member toward the shock absorber, wherein the shock absorber receiver is located at a position corresponding to the shock absorber in the vehicle width direction and in a vehicle height direction.

Since in this front structure of the vehicle body the shock absorber receiver projecting forward from the dash cross member is located at the position corresponding to the shock absorber in the vehicle width direction and in the vehicle height direction, the shock absorber receiver restricts backward movement of the shock absorber upon a collision of the vehicle and a collision load acting on the shock absorber is transmitted through the shock absorber receiver to the dash cross member and is dispersed efficiently to the framework of the vehicle body. As the shock absorber moves backward upon the collision of the vehicle, the shock absorber and the shock absorber receiver come into contact with each other, to increase the number of support points of the shock absorber (points where the shock absorber is supported) and the distance between the support points becomes shorter than before, so as to enhance flexural rigidity and reaction force; therefore, the structure is resistant to a higher collision load than before. The "position corresponding to the shock absorber in the vehicle width direction and in the vehicle height direction" herein means a position where the shock absorber receiver located posteriorly overlaps a part or the whole of the shock absorber in the vehicle width direction and in the vehicle height direction when viewed from the front of the vehicle.

Still another front structure of a vehicle body according to the present invention is a front structure of a vehicle body having a shock absorber extending between the vehicle body and a front wheel in a vehicle and supported on the vehicle body side, and a wheel house covering the shock absorber and the front wheel and connected to a framework of the vehicle body, the front structure comprising a shock absorber receiver projecting from the wheel house toward a region posterior to the shock absorber, wherein the shock absorber receiver extends to a position corresponding to the shock absorber in a vehicle width direction and in a vehicle height direction.

Since in this front structure of the vehicle body the shock absorber receiver projecting from the wheel house toward the region posterior to the shock absorber extends to the position corresponding to the shock absorber in the vehicle width direction and in the vehicle height direction, the shock absorber receiver restricts backward movement of the shock absorber upon a collision of the vehicle and a collision load acting on the shock absorber is transmitted through the shock absorber receiver to the wheel house and is dispersed efficiently to the framework of the vehicle body such as a front side member or an apron upper member, for example. As the shock absorber moves backward upon the collision of the vehicle, the shock absorber and the shock absorber receiver come into contact with each other, to increase the number of support points of the shock absorber (points where the shock absorber is supported) and the distance between the support points becomes shorter than before, so as to enhance flexural rigidity and reaction force; therefore, the structure is resistant to a higher collision load than before. The "position corresponding to the shock absorber in the vehicle width direction and in the vehicle height direction" herein means a position where the shock absorber receiver located posteriorly overlaps a part or the whole of the shock absorber in the vehicle width direction and in the vehicle height direction when viewed from the front of the vehicle.

When the structure adopts a configuration having: a dash panel forming a front wall of a cabin of the vehicle behind the shock absorber and connected to a framework of the vehicle body, wherein the shock absorber receiver is supported by a reinforcing member extending from the dash panel, the structure effectively achieves the aforementioned action and the collision load acting on the shock absorber is transmitted through the reinforcing member to the dash panel and is dispersed more efficiently to the framework of the vehicle body. As the shock absorber receiver moves backward with backward movement of the shock absorber upon the collision of the vehicle, the bending interval of the shock absorber receiver becomes shorter, so as to enhance flexural rigidity and reaction force; therefore, the structure is resistant to a much higher collision load.

When the shock absorber receiver is located behind an intermediate part in an axial direction of the shock absorber, the shock absorber receiver will come into contact with the intermediate part in the axial direction of the shock absorber upon backward movement of the shock absorber, and the distance between support points of the shock absorber becomes approximately half, so as to make the flexural rigidity approximately eight times and the reaction force approximately double; therefore, the structure is resistant to a still higher collision load. The "intermediate part in the axial direction of the shock absorber" herein may be a vertically intermediate part of the shock absorber and may be, for example, an intermediate part of a length from a connection point between an upper end of the shock absorber and the vehicle body to a connection point between a lower end of the shock absorber and a wheel.

BEST MODE FOR CARRYING OUT THE INVENTION

Figure 1:
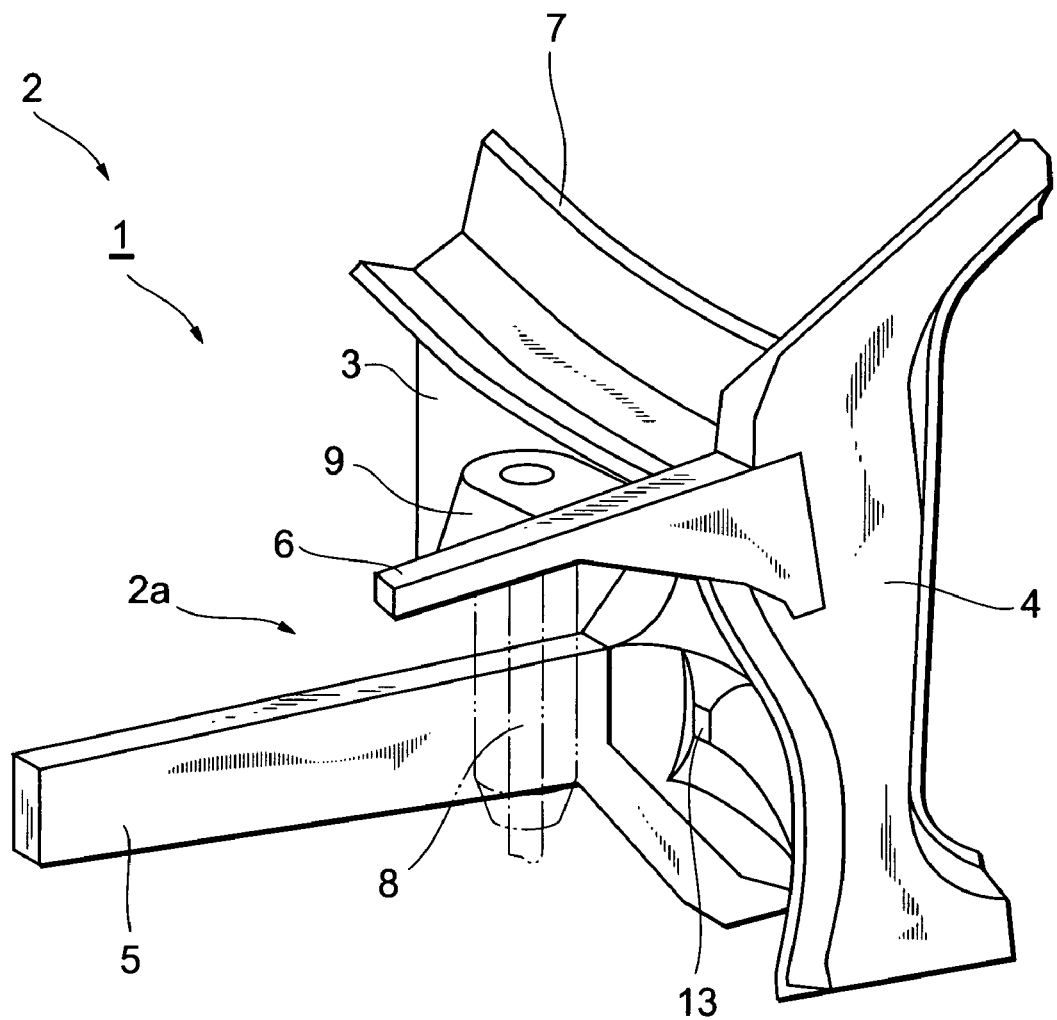
FIG. 1 is a perspective view from the front of a front structure of a vehicle body according to a first embodiment of the present invention.

Preferred embodiments of the front structure of the vehicle body according to the present invention will be described below with reference to the drawings. In the description of the drawings, identical or equivalent elements will be denoted by the same reference symbols, without redundant description. FIG. 1 is a perspective view from the front of a front structure of a vehicle body according to the first embodiment of the present invention, and FIG. 2 a schematic side view showing a state of transmission of a collision load. In the description of the drawings, identical or equivalent elements will be denoted by the same reference symbols, without redundant description. In the present specification, "forward" is defined as a forward direction during straight forward driving of a vehicle, and terms used herein are those indicating directions of "front," "back," "left," "right," etc. with respect to it.

Figure 2:
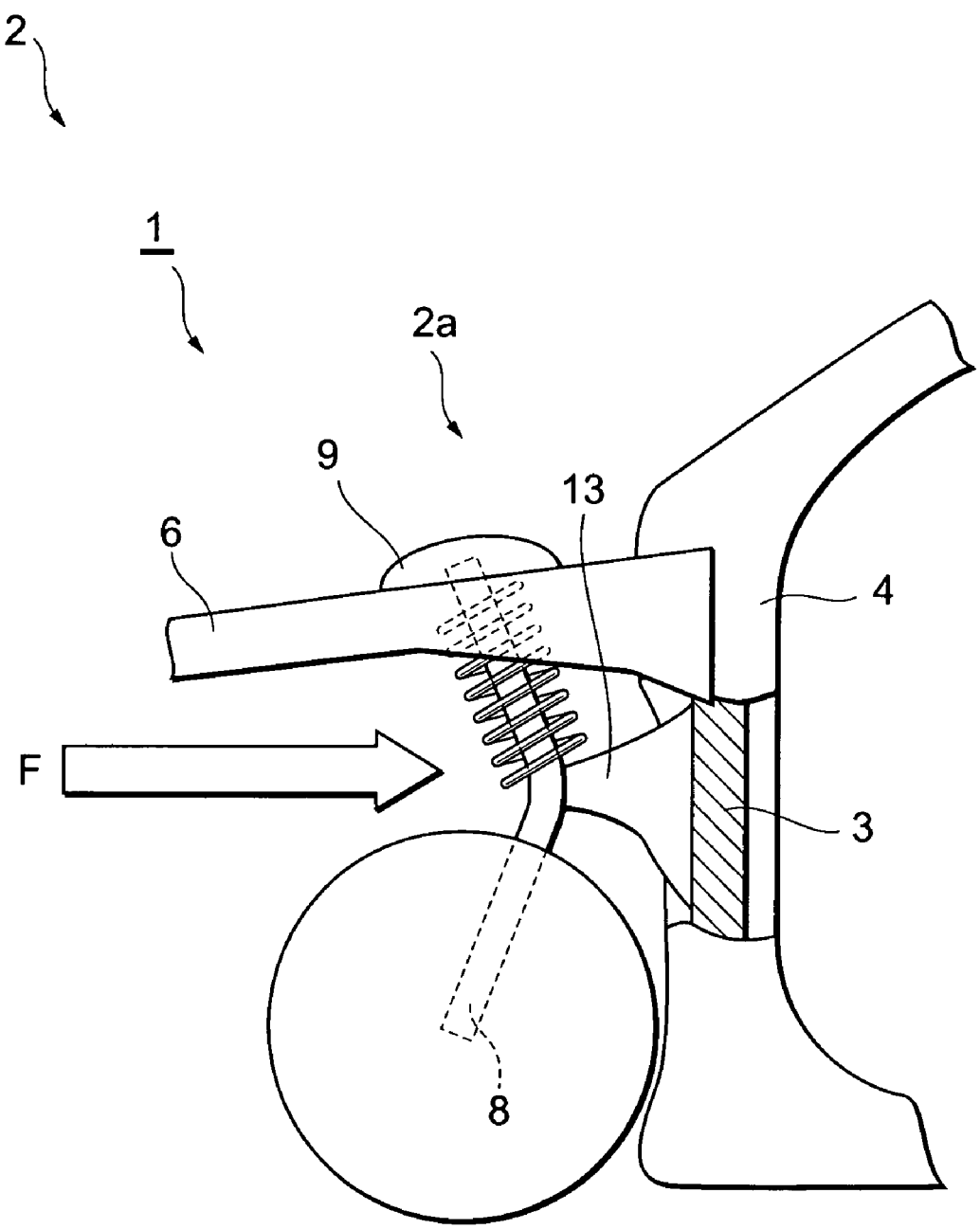
FIG. 2 is a schematic side view showing a state of transmission of a collision load.

The front structure 1 of the vehicle body shown in FIGS. 1 and 2 is a front structure of a vehicle body in a vehicle 2 such as a car, for example. The vehicle 2 is provided with an engine room 2a in the front part, a cabin is formed with a dash panel 3 as a partition wall behind the engine room 2a, and a front body pillar (front pillar, which will be referred to hereinafter as A-pillar) 4 being a part of a framework member of the vehicle body is connected to each of both ends of the dash panel 3 in the vehicle width direction. A dash cross member extending in the vehicle width direction and constituting a part of the framework member of the vehicle body is connected to the rear surface (on the cabin side) of the dash panel 3. It is noted that FIG. 1 depicts only the left side.

The front structure 1 of the vehicle body will be detailed below. This front structure 1 of the vehicle body comprises a pair of front side members (only one of which is depicted) 5 located on both sides in the vehicle width direction with the engine in between and extending in the longitudinal direction, apron upper members 6 constituting an upper part of a frame of the engine room 2a of the vehicle 2, outside the front side members 5 in the vehicle width direction, and a cowl part 7 which is located above the dash panel 3 and the both ends of which in the vehicle width direction are connected to the respective A-pillars 4.

Each front side member 5 being a part of the framework member of the vehicle body extends from the front toward the dash panel 3, is connected to the front surface of the dash panel 3, and is bent downward from the front surface side of the dash panel 3, so as to extend to the lower surface side of a floor panel of the cabin. The front side member 5 is a member that enhances the strength and rigidity of the vehicle body and that absorbs impact unabsorbed by the front part of the vehicle 2 such as a bumper upon a collision, and the front side member 5 has a predetermined deformation load.

The apron upper members 6 are located on both sides in the vehicle width direction of the vehicle 2 and extend in the longitudinal direction, the aforementioned A-pillar 4 is connected to the rear end side of each apron upper member 6, and a suspension tower 9 for supporting an upper part of shock absorber 8 used in the front suspension, on the vehicle body side is provided inside the apron upper member 6 in the vehicle width direction. This suspension tower 9 is of an approximately cylindrical shape projecting from the apron upper member 6 toward the engine room 2a in the vehicle width direction and extending in the vehicle height direction and is shaped to cover the shock absorber 8 from the engine room 2a side and configured to suspend the shock absorber 8 and a front wheel of the vehicle 2. Furthermore, a wheel house for housing a front wheel is continuously formed below the suspension tower 9, the interior lower part of this wheel house in the vehicle width direction is connected to the front side member 5, and the exterior lower part of the wheel house is connected to the front surface of the dash panel 3.

The front structure 1 of the vehicle body of the present embodiment comprises a shock absorber receiver 13 projecting from the dash panel 3 toward the shock absorber 8. This shock absorber receiver 13 is located at a position corresponding to the shock absorber 8 in the vehicle width direction and in the vehicle height direction, and extends approximately horizontally in the longitudinal direction of the vehicle 2. The rear end of the shock absorber receiver 13 is connected to the front surface of the dash panel 3 and the front end thereof is located behind the shock absorber 8. The shock absorber receiver 13 is located at a position where it overlaps the shock absorber 8 when viewed from the front of the vehicle 2. In the vehicle height direction, the shock absorber receiver 13 is located at a position corresponding to an intermediate part in the axial direction of the shock absorber 8. The "intermediate part in the axial direction of the shock absorber 8" herein means a vertically intermediate part of the shock absorber and intermediate part of a length from a connection point between the upper end of the shock absorber and the vehicle body to a connection point between the lower end of the shock absorber and the wheel.

In this front structure 1 of the vehicle body constructed as described above, when the vehicle 2 comes to collide with another vehicle, for example, in the front part, a load F is exerted from the front on the shock absorber 8, as shown in FIG. 2, and the shock absorber 8 moves backward to hit the front end of the shock absorber receiver 13 whereby the backward movement (deformation) of the shock absorber 8 is restricted; therefore, the load F on the shock absorber 8 is transmitted through the shock absorber receiver 13 and dash panel 3 to the cowl part 7, dash cross member, and A-pillar 4 to be dispersed to the framework member of the vehicle body. In the front structure 1 of the vehicle body of the present embodiment as described above, the collision load F on the shock absorber 8 is efficiently dispersed to the framework of the vehicle body. Since the shock absorber receiver 13 is located behind the intermediate part in the axial direction of the shock absorber 8, it comes into contact with the intermediate part in the axial direction of the shock absorber 8 with backward movement of the shock absorber 8, to increase the number of support points of the shock absorber 8 and the distance between the support points becomes shorter than before, so as to make the distance between the support points of the shock absorber 8 approximately half, the flexural rigidity approximately eight times, and the reaction force approximately double; therefore, the structure is resistant to a higher collision load.

The first embodiment showed the configuration wherein the shock absorber receiver 13 and the dash panel 3 were constructed as separate members, but it is also possible to adopt a configuration wherein the shock absorber receiver 13 and the dash panel 3 are constructed as an integral member.

Figure 3:
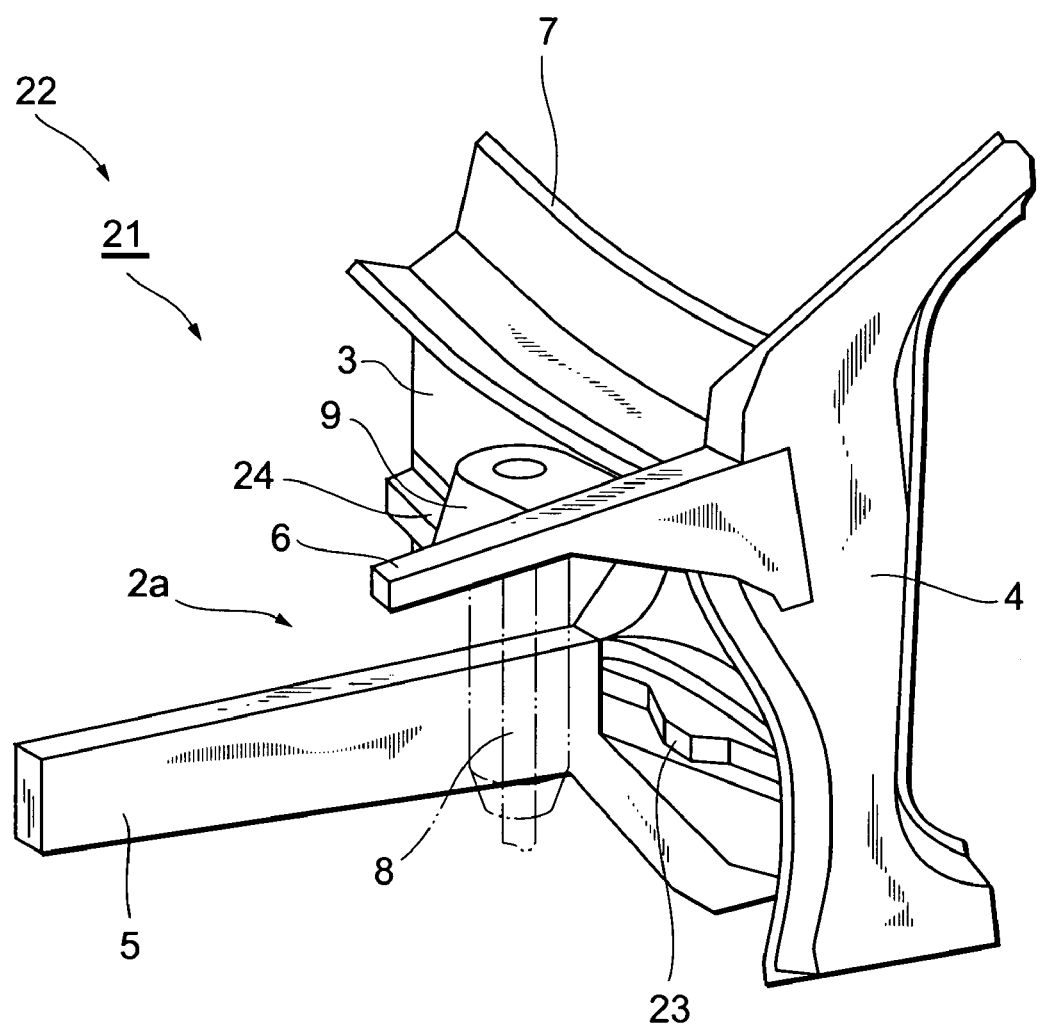
FIG. 3 is a perspective view from the front of a front structure of a vehicle body according to a second embodiment of the present invention.

Next, the front structure of the vehicle body according to the second embodiment of the present invention will be described with reference to FIG. 3. This front structure 21 of the vehicle body of the second embodiment is different from the front structure 1 of the vehicle body of the first embodiment in that a dash cross member 24 extending in front of the dash panel 3 is used instead of the dash cross member extending behind the dash panel 3 and in that a shock absorber receiver 23 projecting from the dash cross member 24 toward the shock absorber 8 is used instead of the shock absorber receiver 13 projecting from the dash panel 3 toward the shock absorber 8.

This shock absorber receiver 23 is located at a position corresponding to the shock absorber 8 in the vehicle width direction and in the vehicle height direction, and extends approximately horizontally in the longitudinal direction of the vehicle 2. The rear end of the shock absorber receiver 23 is connected to a front surface of the dash cross member 24 and the front end thereof is located behind the shock absorber 8. The shock absorber receiver 23 is provided at a position where it overlaps the shock absorber 8 when viewed from the front of the vehicle 2. In the vehicle height direction, the shock absorber receiver 23 is located at a position corresponding to an intermediate part in the axial direction of the shock absorber 8. The "intermediate part in the axial direction of the shock absorber 8" herein means a vertically intermediate part of the shock absorber and intermediate part of the length from the connection point between the upper end of the shock absorber and the vehicle body to the connection point between the lower end of the shock absorber and the wheel.

In the front structure 21 of the vehicle body constructed as described above, when the vehicle 22 comes to collide with another vehicle, for example, in the front part, the load F on the shock absorber 8 is transmitted to the shock absorber receiver 23 and then through the dash cross member 24 to the dash panel 3, cowl part 7, and A-pillar 4 to be dispersed to the framework member of the vehicle body, and the intermediate part of the shock absorber 8 comes into contact with the shock absorber receiver 23. Therefore, the front structure 21 is able to achieve much the same effect as the front structure 1 of the vehicle body of the first embodiment.

The second embodiment adopts the configuration wherein the shock absorber receiver 23 and the dash cross member 24 are constructed as separate members, but it is also possible to adopt a configuration wherein the shock absorber receiver 23 and the dash cross member 24 are constructed as an integral member.

Next, the front structure of the vehicle body according to the third embodiment of the present invention will be described with reference to FIGS. 4 and 5. This front structure 31 of the vehicle body of the third embodiment is different from the front structure 1 of the vehicle body of the first embodiment in that the front structure 31 is provided with a pair of wheel house braces 34, 35 arranged in front of and behind the shock absorber 8 and in that a wheel house brace support 33 supporting the rear wheel house brace 35 from the back is used instead of the shock absorber receiver 13 projecting from the dash panel 3 toward the shock absorber 8. The wheel house brace 35 on the rear side serves as a shock absorber receiver projecting from the wheel house toward a region posterior to the shock absorber 8.

The wheel house braces 34, 35 extend in the vehicle height direction, an upper end of each brace is connected to the apron upper member 6, and a lower end thereof is connected to the front side member 5, thereby reinforcing the wheel house. As shown in FIG. 5, the rear wheel house brace 35 is configured as follows: on the front view, the upper end extends vertically with an approximately constant width, an intermediate part is inclined toward the front side member 5 side, and the lower end becomes narrower toward the front side member side. As shown in FIGS. 4 and 5, the intermediate part of the rear wheel house brace 35 is located at a position where it overlaps the shock absorber 8 when viewed from the front of the vehicle 2. In the vehicle height direction, the intermediate part of the rear wheel house brace 35 is located at a position corresponding to the intermediate part in the axial direction of the shock absorber 8. The shock absorber 8 indicated by imaginary lines in FIG. 5 is located in front of the wheel house brace 35. The "intermediate part in the axial direction of the shock absorber 8" herein means a vertically intermediate part of the shock absorber and intermediate part of the length from the connection point between the upper end of the shock absorber and the vehicle body to the connection point between the lower end of the shock absorber and the wheel.

Figure 4:
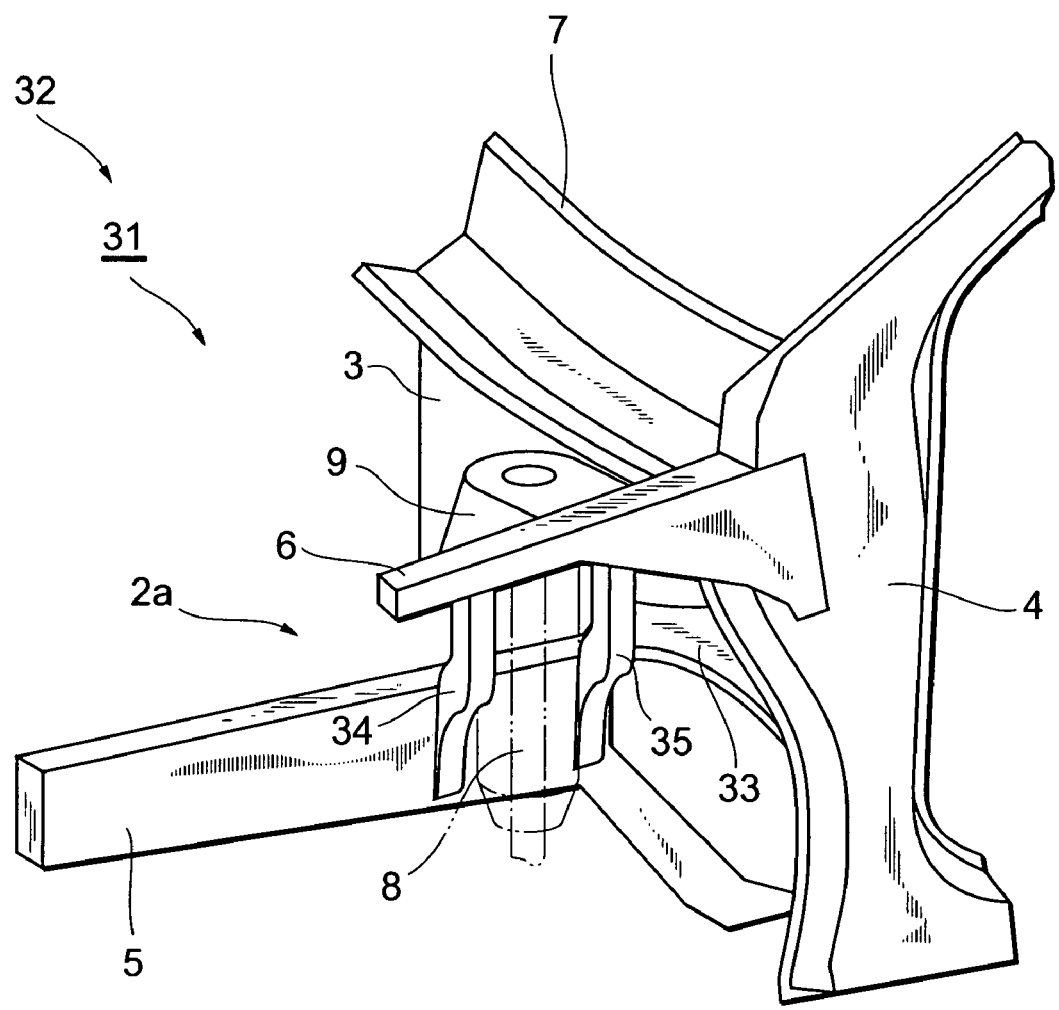
FIG. 4 is a perspective view from the front of a front structure of a vehicle body according to a third embodiment of the present invention.
Figure 5:
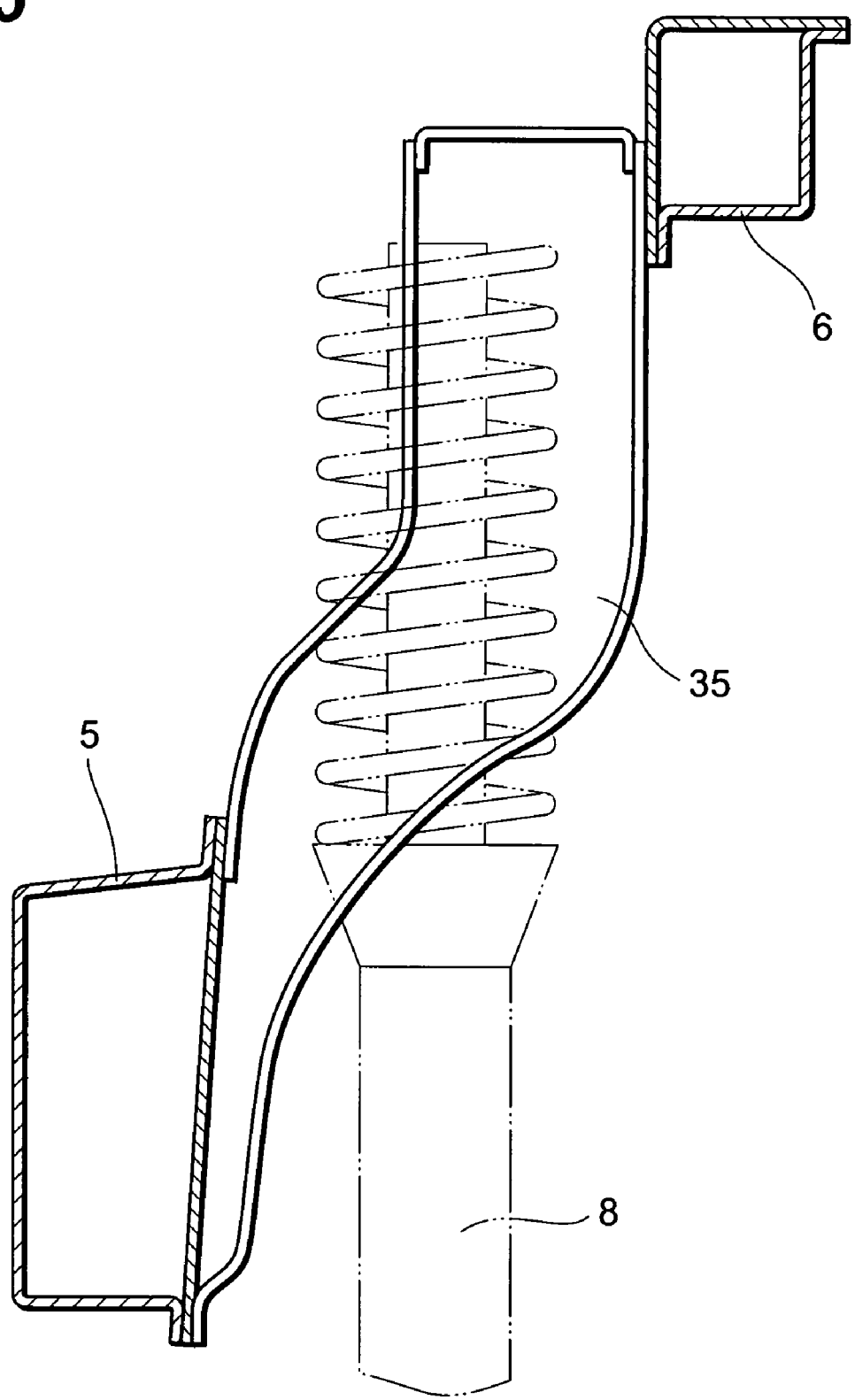
FIG. 5 is a front view of a wheel house brace in FIG. 4.

As shown in FIG. 4, the wheel house brace support 33 is a reinforcing member that extends in the longitudinal direction of the vehicle 32, that has a front end connected to a rear surface of the intermediate part of the wheel house brace 35 and a rear end connected to the front surface of the dash panel 3, and that supports the rear wheel house brace 35 from the back.

In the front structure 31 of the vehicle body constructed as described above, when the vehicle 32 comes to collide with another vehicle, for example, in the front part, the load F on the shock absorber 8 is transmitted through the rear wheel house brace 35 to the front side member 5, apron upper member 6, and wheel house to be dispersed to the framework member of the vehicle body, and the intermediate part of the shock absorber 8 comes into contact with the rear wheel house brace 35. Therefore, the front structure 31 is able to achieve much the same effect as in the first embodiment and, in addition, since it has the wheel house brace support 33 for supporting the rear wheel house brace 35 from the back, the collision load F on the shock absorber 8 is transmitted through the rear wheel house brace 35 and the wheel house brace support 33 to the dash panel 3, so as to be dispersed more efficiently to the framework of the vehicle body. When the wheel house brace 35 moves backward with backward movement of the shock absorber 8 upon the collision of the vehicle, the bending interval of the wheel house brace 35 becomes shorter, so as to enhance the flexural rigidity and reaction force; therefore, the structure is resistant to a much higher collision load.

Figure 6:
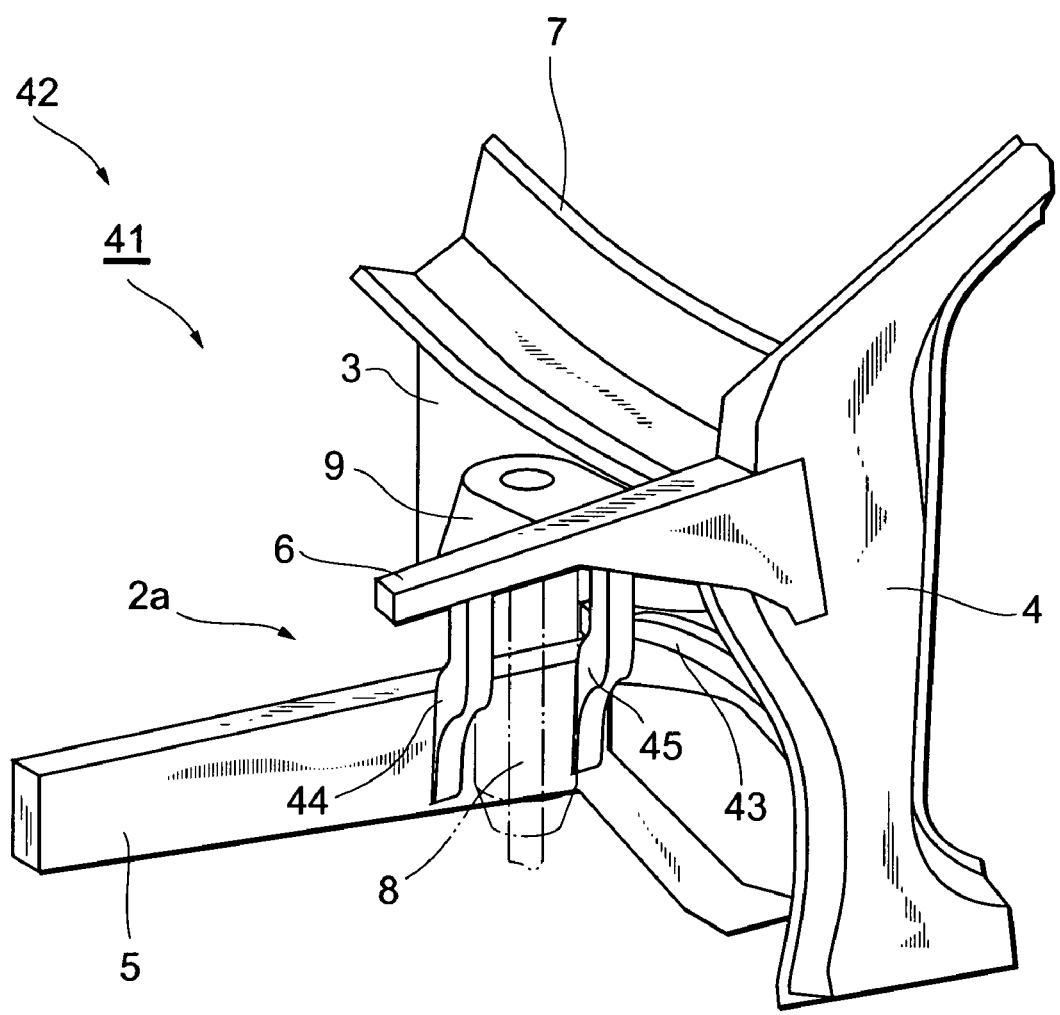
FIG. 6 is a perspective view from the front of a front structure of a vehicle body according to a fourth embodiment of the present invention.

Next, the front structure of the vehicle body according to the fourth embodiment of the present invention will be described with reference to FIG. 6. This front structure 41 of the vehicle body of the fourth embodiment is different from the front structure 1 of the vehicle body of the first embodiment in that the front structure 41 is provided with a pair of wheel house braces 44, 45 located in front of and behind the shock absorber 8 and in that a shock absorber receiver 43 supporting the rear wheel house brace 45 from the back and projecting from the rear wheel house brace 45 toward the shock absorber 8 is used instead of the shock absorber receiver 13 projecting from the dash panel 3 toward the shock absorber 8. The rear wheel house brace 45 is constructed so as to project from the wheel house toward a region posterior to the shock absorber 8.

The wheel house braces 44, 45 extend in the vehicle height direction, the upper end of each brace is connected to the apron upper member 6, and the lower end thereof is connected to the front side member 5, thereby reinforcing the wheel house.

The shock absorber receiver 43 is located at a position corresponding to the shock absorber 8 in the vehicle width direction and in the vehicle height direction, and extends approximately horizontally in the longitudinal direction of the vehicle 42. A rear end of the shock absorber receiver 43 is connected to the front surface of the dash panel 3 and a front end thereof is connected to a rear surface of the rear wheel house brace 45 and projects forward from the rear wheel house brace 45 to be located behind the shock absorber 8 and at a position where it overlaps the shock absorber 8 when viewed from the front of the vehicle. In the vehicle height direction, the shock absorber receiver 43 is located at a position corresponding to the intermediate part in the axial direction of the shock absorber 8. The "intermediate part in the axial direction of the shock absorber 8" herein means a vertically intermediate part of the shock absorber and intermediate part of the length from the connection point between the upper end of the shock absorber and the vehicle body to the connection point between the lower end of the shock absorber and the wheel.

In the front structure 41 of the vehicle body constructed as described above, when the vehicle 42 comes to collide with another vehicle, for example, in the front part, the load F on the shock absorber 8 is transmitted to the shock absorber receiver 43 and then through the dash cross member 24 to the dash panel 3, cowl part 7, and A-pillar 4 to be dispersed to the framework member of the vehicle body, and the intermediate part of the shock absorber 8 comes into contact with the shock absorber receiver 43. Therefore, the front structure 41 is able to achieve much the same effect as the front structure 1 of the vehicle body of the first embodiment and, in addition, since the shock absorber receiver 43 is constructed to support the wheel house brace 45 from the back, the shock absorber receiver 43 is able to restrict backward movement of the wheel house brace 45 and the collision load F acting on the shock absorber 8 is transmitted through the wheel house brace 45 to the wheel house, front side member 5, and apron upper member 6 to be dispersed more efficiently to the framework of the vehicle body. When the wheel house brace 45 moves backward with backward movement of the shock absorber 8 upon the vehicle collision, the bending interval of the wheel house brace 45 becomes shorter, so as to enhance the flexural rigidity and reaction force; therefore, the front structure 41 is resistant to a much higher collision load.

The connections of the various members may be implemented by welding, bonding, or joining with bolts.

The present invention was described specifically on the basis of the embodiments thereof, but it is noted that the present invention is by no means limited to the above embodiments. The above embodiments showed the particularly preferred configurations in which the shock absorber receiver 13, 23, 35, or 43 was located behind the intermediate part in the axial direction of the shock absorber 8, but it is also possible to adopt a configuration wherein the shock absorber receiver is located at any other position behind the shock absorber 8. The point is that the shock absorber receiver 13, 23, 35, or 43 is located at a position where it can restrict the backward movement of the shock absorber 8.

INDUSTRIAL APPLICABILITY

Since the front structure of the vehicle body of the present invention is arranged to transmit the collision load acting on the shock absorber, through the shock absorber receiver to the framework of the vehicle body, it becomes feasible to efficiently disperse the collision load acting on the front part of the vehicle. Since the front structure enhances the flexural rigidity and reaction force of the shock absorber, it is resistant to a higher collision load than before.

The invention claimed is:

1. A front structure of a vehicle body having a shock absorber extending between the vehicle body and a front wheel in a vehicle and supported on the vehicle body side, and a dash panel forming a front wall of a cabin of the vehicle behind the shock absorber and connected to a framework of the vehicle body, the front structure comprising a shock absorber receiver for receiving the shock absorber in case of a displacement thereof upon a collision of the vehicle, wherein the shock absorber receiver:

projects from the dash panel toward the shock absorber;

is located at a position corresponding to the shock absorber in a vehicle width direction and in a vehicle height direction; and includes a first end and a second end opposite the first end, the first end being connected to the dash panel, and the second end not being in contact with the shock absorber.

2. A front structure of a vehicle body according to claim 1, having:

a wheel house covering the shock absorber and the front wheel and connected to the framework of the vehicle body; and a wheel house brace projecting from the wheel house toward a region posterior to the shock absorber, wherein the shock absorber receiver supports the wheel house brace from a back side thereof and projects from the wheel house brace toward the shock absorber.

3. A front structure of a vehicle body according to claim 2, wherein the shock absorber receiver is located behind the shock absorber.

4. A front structure of a vehicle body according to claim 1, wherein the shock absorber receiver is located behind the shock absorber.

5. A front structure of a vehicle body having a shock absorber extending between the vehicle body and a front wheel in a vehicle and supported on the vehicle body side, and a dash cross member extending in a vehicle width direction behind the shock absorber and in front of a cabin of the vehicle and forming a part of a framework of the vehicle body, the front structure comprising a shock absorber receiver projecting directly from the dash cross member toward the shock absorber, wherein the shock absorber receiver is located at a position corresponding to the shock absorber in the vehicle width direction and in a vehicle height direction.

6. A front structure of a vehicle body according to claim 5, wherein the shock absorber receiver is located behind the shock absorber.

7. A front structure of a vehicle body having a shock absorber extending between the vehicle body and a front wheel in a vehicle and supported on the vehicle body side, and a wheel house covering the shock absorber and the front wheel and connected to a framework of the vehicle body, the front structure comprising a shock absorber receiver for receiving the shock absorber in case of a displacement thereof upon a collision of the vehicle, the shock absorber receiver projecting from the wheel house toward a region posterior to the shock absorber, where in the shock absorber receiver extends to a position corresponding to the shock absorber in a vehicle width direction and in a vehicle height direction, and wherein the shock absorber receiver is not in contact with the shock absorber.

8. A front structure of a vehicle body according to claim 7, having:

a dash panel forming a front wall of a cabin of the vehicle behind the shock absorber and connected to the framework of the vehicle body, wherein the shock absorber receiver is supported by a reinforcing member extending from the dash panel.

9. A front structure of a vehicle body according to claim 8, wherein the shock absorber receiver is located behind the shock absorber.

10. A front structure of a vehicle body according to claim 7, wherein the shock absorber receiver is located behind the shock absorber.

\* \* \* \* \*